United States Patent [19]

Kubacak et al.

[11] Patent Number: 5,215,255

[45] Date of Patent: * Jun. 1, 1993

[54] ROADSIDE SPRAY APPARATUS

[75] Inventors: Johnny L. Kubacak, Jourdanton; Gary D. Byrd, Bulverde, both of Tex.

[73] Assignee: Cibolo Manufacturing Company, Jourdanton, Tex.

[*] Notice: The portion of the term of this patent subsequent to Apr. 16, 2008 has been disclaimed.

[21] Appl. No.: 685,518

[22] Filed: Apr. 15, 1991

Related U.S. Application Data

[63] Continuation of Ser. No. 722,411, Apr. 10, 1985, Pat. No. 5,007,585, which is a continuation of Ser. No. 636,066, Jul. 30, 1984, abandoned, which is a continuation of Ser. No. 348,509, Feb. 12, 1982, abandoned, which is a continuation-in-part of Ser. No. 67,552, Aug. 17, 1979, Pat. No. 4,315,602.

[51] Int. Cl.⁵ .................. B05B 1/20; B05B 15/08
[52] U.S. Cl. ..................... 239/164; 239/172; 239/176; 239/288; 239/562
[58] Field of Search .............. 239/162, 164, 169, 170, 239/176, 587, 288–288.5, 562, 172

[56] References Cited

U.S. PATENT DOCUMENTS

| | | |
|---|---|---|
| 1,102,354 | 7/1914 | Pougnet . |
| 2,432,309 | 12/1947 | Gore ................... 239/164 |
| 2,596,473 | 5/1952 | Essick .................. 239/164 |
| 2,655,405 | 10/1953 | Lattner ................. 239/169 |
| 2,995,307 | 8/1961 | McMahon .............. 239/124 |
| 3,117,725 | 1/1964 | Palmer ................. 239/162 |
| 3,369,754 | 2/1968 | Wolford . |
| 3,831,848 | 8/1974 | Cook ................. 239/288.5 |
| 4,252,274 | 2/1981 | Kubacak .............. 239/170 |
| 5,007,585 | 4/1991 | Kubacak et al. ......... 239/176 |

FOREIGN PATENT DOCUMENTS

| | | | |
|---|---|---|---|
| 508283 | 12/1954 | Canada ................. 239/176 |
| 895023 | 4/1962 | United Kingdom .......... 239/172 |

Primary Examiner—Andres Kashnikow
Attorney, Agent, or Firm—Donald R. Comuzzi

[57] ABSTRACT

A roadside spray apparatus having a spraying head with a plurality of nozzles mounted on the spraying head. The inclination of the spraying head is selectively adjustable to direct spray to a desired location. The spray head includes a plurality of independently operated nozzles oriented to spray side-by-side swaths at the side of a vehicle.

4 Claims, 4 Drawing Sheets

ROADSIDE SPRAY APPARATUS

CROSS REFERENCE TO RELATED APPLICATIONS

The present application is a continuation of application Ser. No. 722,411, filed Apr. 10, 1985 which is now U.S. Pat. No. 5,007,585, issued Apr. 16, 1991, which is a continuation of application Ser. No. 636,066, filed Jul. 30, 1984, now abandoned, which is a continuation of application Ser. No. 348,509, filed Feb. 12, 1982, now abandoned, which is a continuation-in-part application Ser. No. 067,552, filed Aug. 7, 1970, which is now U.S. Pat. No. 4,315,602, issued Feb. 16, 1982.

BACKGROUND OF THE INVENTION

This invention relates to spray apparatus and more particularly to automated apparatus for roadside spraying of herbicides which is mounted on a front of a vehicle and controlled by a operator of the vehicle.

Many state highway departments, counties and cities, have for several years been actively mowing and brush cutting undesirable weeds, grass and brush in their right-of-ways. This has been primarily accomplished by hand labor or mechanical means. Many of these publicly funded organizations have attempted to spray their right-of-ways with selective herbicides that would control the undesirable plant growth and leave predominantly low growing grasses. Two programs that have been used for several years are MSMA to control johnson grass and 2-4-D to control broad leaves and brush.

The equipment which has been used in the past has been of generally three types. A common type of equipment is the long boom extending out to the side of the truck and across the right-of-way. An example fo a long boom is shown in U.S. Pat. No. 2,995,307 issued to J. J. McMahon. The use of the handgun is still common today for lack of anything with more versatility. Another has been the use of an off-center nozzle mounted to the side of the truck. The use of the off-center nozzle is discussed further below.

The long-extending boom has been used widely because of its ability to reach 25 to 30 feet into the right-of-way. Some designs have provided the boom in sections to give the operator more flexibility as to where he could spray the herbicide. This has also allowed the operator to save chemical. A problem with this type of unit is that it does not lend itself to many right-of-way applications because of hills, back slopes and obstructions in the areas to be sprayed. Obstructions are believed to be a major problem. The extended boom is vulnerable to contact with obstructions causing extensive down time and delays with loss of production. It is also believed to be very expensive to replace such booms. The use of hydraulic cylinders mounted along the boom may make the application even more cumbersome since the driver may have to slow the speed of the spray truck upon the encountering of several obstructions, such as trees, signs, bluffs, and the like. Under such circumstances, the operator might get too little, or no herbicide at all in certain areas because the boom was raised to go over the sign and wind blew many of the small particles away or the sprayed area received excessive rates of the herbicide due to the slower speeds of the truck. In some situations it is necessary to use two operators. This increases the costs due to the extra labor required and often the spray may not get to the target area while passing over obstructions. Also long booms require the vehicle to have greater gross vehicle weight because a long spray boom attached to the front of the vehicle may require heavier axles and generally heavier duty vehicles to support the long beams.

It is believed that the off-center nozzle in many cases had advantages over the long booms because the operator could spray all day without worrying about obstructions in the right-of-way. This nozzle could be mounted anywhere to the side of the vehicle and the spray pattern covered an area beginning immediately beside the truck and extending from 10 to 30 feet out into the right-of-way. Wind velocity tended to dramatically effect the distance and in such circumstances the spray might not extend past 10 to 15 feet from the vehicle. This type of nozzle also did not give the operator much versatility to place a herbicide only in areas where undesired vegetation existed across the right-of-way. In practice, the weeds are often in spotted areas lying 20 to 40 feet away from the spray truck and the operator has no way to get the herbicide to the target, especially if the wind velocity over powers the spray. The operator also, in certain situations, needs to spray the herbicide next to the vehicle, where only undesirable taller growing vegetation exists. In certain situations this may cause more herbicide to be used than necessary such as with off-center nozzles, which unnecessarily may increase the costs of the spraying program.

The same problems also exist with controlling undesirable brush. A long extending boom as far as known, is not often used for this purpose. Generally the use of a handgun and the off-center spraying means are used in such situations. Spotted applications to the soil under the undesirable brush with the use of a handgun, spraying specially selected herbicides, provide easy control of brush. In such situations, herbicides were often used, whereby rain would carry the chemical into the root zone to be picked up by the brush. This type of chemical interfers in the natural processes in the plant causing its ultimate death. A problem with spotted application of such herbicides by handguns on such undesirable brush, is that it is slow, which increases application cost and in most cases the herbicide is overapplied resulting in excessively killing of low growing desirable ground cover.

With the development of new herbicides, especially new selective herbicides, it has become more important to eliminate the problem encountered with extended booms, off-center nozzles and handguns. In the case of certain chemicals, it is necessary to apply them from 1 to 1½ quarts per acre or 43,560 square feet. In the case of other currently used chemicals, it is necessary to apply them at 4 to 8 ounces to control more susceptable tall growing vegetation. Greater amounts of these herbicides may kill the low growing, more tolerant species of vegetation and leave partial to total bare ground. Such problems often prevent many highway departments, counties and cities from going into vegetation management programs with the new herbicides to eliminate the more costly program of hand labor and mechanical mowing.

Applicant's invention helps overcome the above discussed problems. An object of the invention is to provide a spraying apparatus capable of spraying smaller particles in spray swaths adjacent to the vehicle and larger particles in areas farther away from the vehicle. An object of the invention is to allow an operator to spray the larger particles up to 40 feet away from the vehicle. Another object of the invention is to provide a spray pattern which is less affected by wind. Another object of the invention is to allow an operator to spray spotted weed problems at any location up to 40 feet away from the vehicle without wasting herbicide where only desirable low growing vegetation exists. Another object of the invention is to allow an operator the option of applying herbicides at exacting rates at selected locations across the right-of-way to prevent overuse of herbicide and potential damage to low growing grass, where no undesirable weeds exist. Another object of the invention is to provide a spraying apparatus which provides foliar applications of herbicides on brush at any selected location in the right-of-way. Other objects of the invention will be apparent from the following detailed disclosure.

SUMMARY OF THE INVENTION

The invention comprises a spraying apparatus having a plurality of separately operable spraying nozzles for selectively spraying a herbicide or other material on a desired location at the side of a motor vehicle. The nozzles are mounted upon a spraying head which may be remotely operated by an operator to change the inclination of the nozzles to spray any desired location. Separate spraying nozzles on the head are oriented to spray at selected locations and some of the nozzles spray smaller particles for short distances and other nozzles spray large particles for longer distances.

DESCRIPTION OF THE PREFERRED EMBODIMENT

Figure 1:
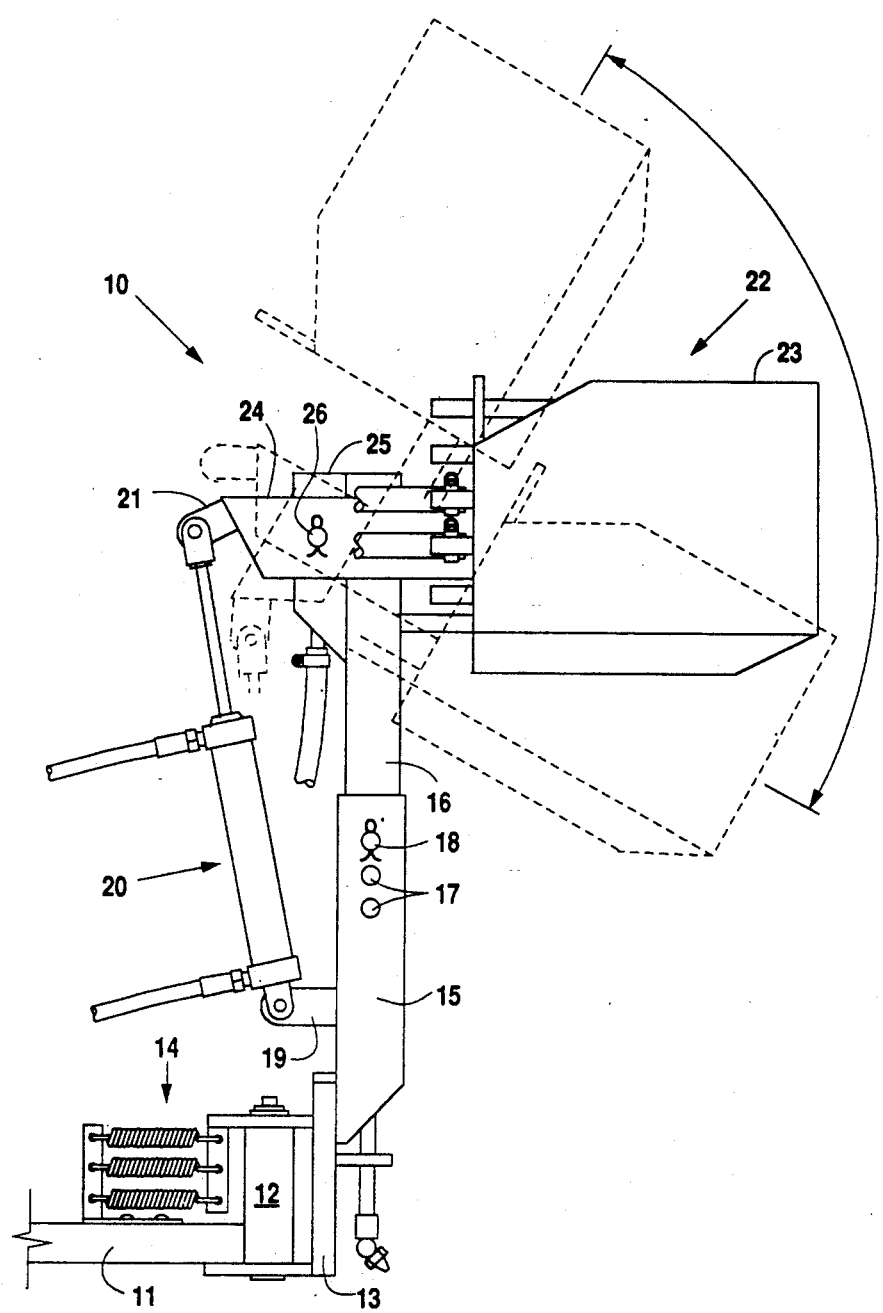
FIG. 1 is a front view showing the spraying apparatus of the invention.

The spraying apparatus of FIG. 1 is adapted to be used upon a motor vehicle in connection with tank and pump means. U.S. Pat. No. 4,315,602 discloses tank and pump means which may be used in connection with this invention and this patent is incorporated herein into to by this specific reference thereto for any and all purposes.

Figure 4:
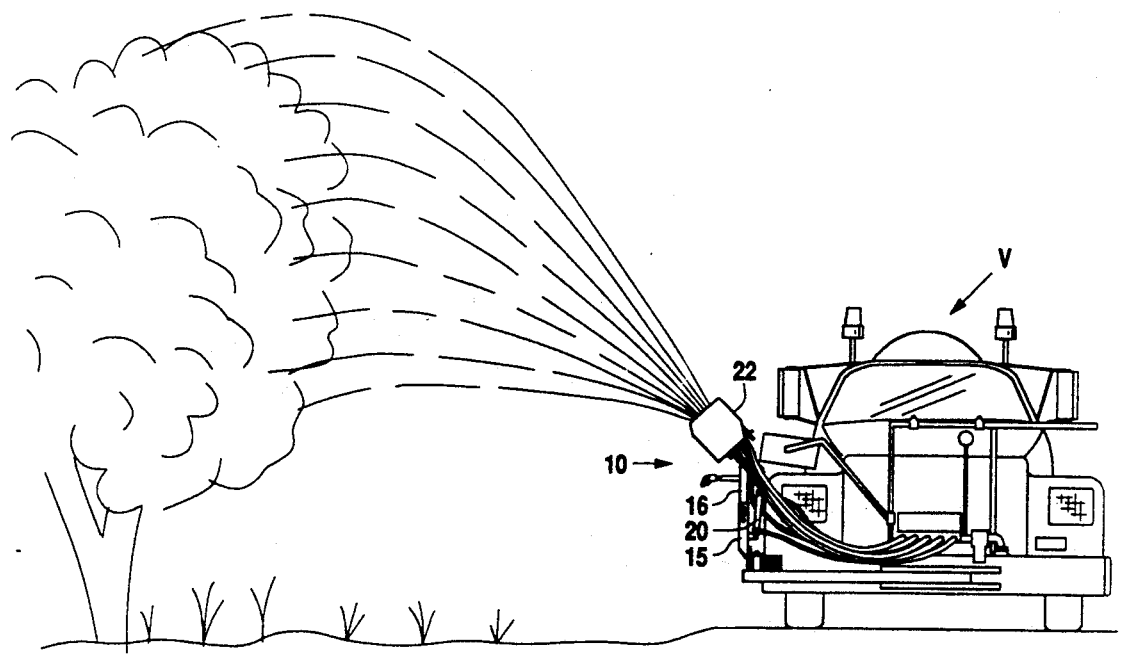
FIG. 4 is another view of the spray apparatus mounted on a vehicle showing another spray pattern.
Figure 5:
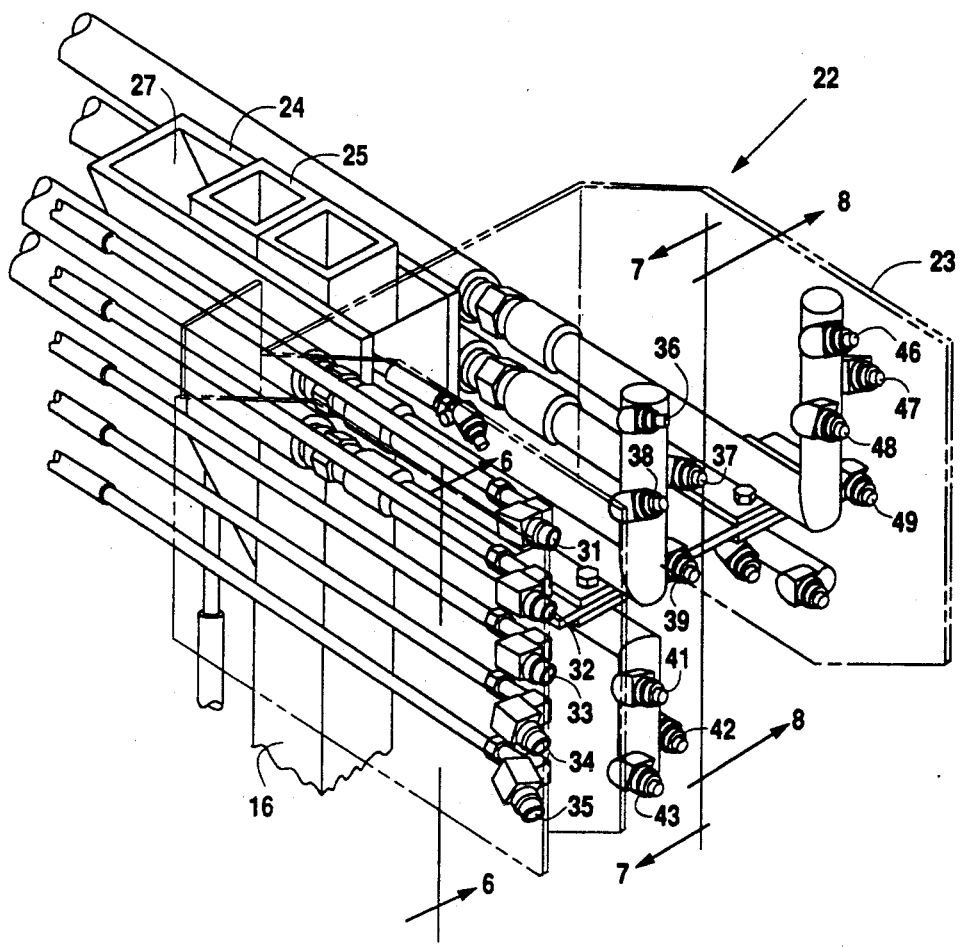
FIG. 5 is a broken cross sectional view showing the nozzle arrangement.

Referring to FIG. 1, there is shown a spraying apparatus 10 which is mounted on a motor vehicle V as shown in FIGS. 4 and 5. Spraying apparatus 10 includes a main support beam 11 which is mounted to the front of the vehicle V in a manner such as disclosed in U.S. Pat. No. 4,315,602. A journal 12 is connected with the beam 11. A pivot mechanism including a bifurcated member 13 is pivoted to the journal and maintained in position by spring means 14 as also disclosed in U.S. Pat. No. 4,315,602.

A first vertical beam 15 is connected to the bifurcated member 13. The vertical beam 15 is in the form of a square channel member for receiving post 16. A plurality of apertures 17 receive the removable pin 18 which provides vertical adjustment of the post 16.

Secured to the vertical beam 15 is a support arm 19. An electric air or hydraulic cylinder means 20 or other remotely controlled power means is connected at one end to the support arm 19 and at its upper end to a support arm 21. The support arm 21 is connected to a spraying means or head 22. The spraying means 22 includes a generally U-shaped shield 23 which is connected to U-shaped member 24. The post 16 includes a pivot bracket 25 which is secured to the post 16. The U-shaped member 24 is pivotally connected to the pivot bracket 25 by pivot pin 26. The support arm 21 is connected to the connecting portion 27 of the U-shaped member 24. As will be apparent, extension and retraction of the hydraulic cylinder means 20 will cause the spraying means 22 to pivot as shown in broken lines in FIG. 1 and also as shown in FIGS. 4 and 5.

The spraying means 22 includes a plurality of independently operated nozzle means to provide a predetermined droplet size and to provide a spraying band at a predetermined location. The spraying band covers a preselected swath to deposit spray at the desired location.

Figure 2:
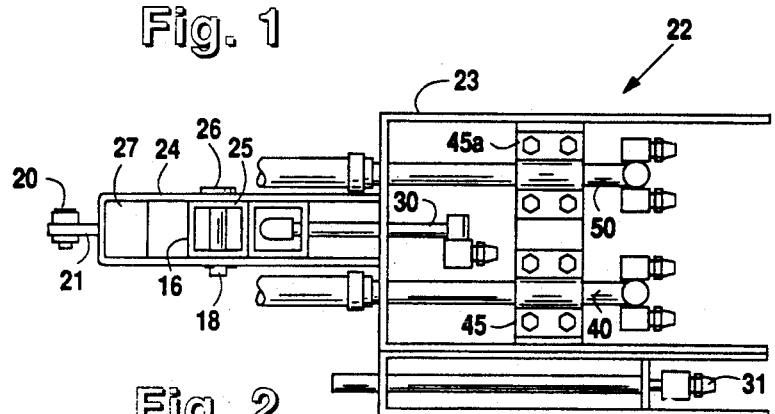
FIG. 2 is a plan view showing the spraying apparatus of the invention.
Figure 3:
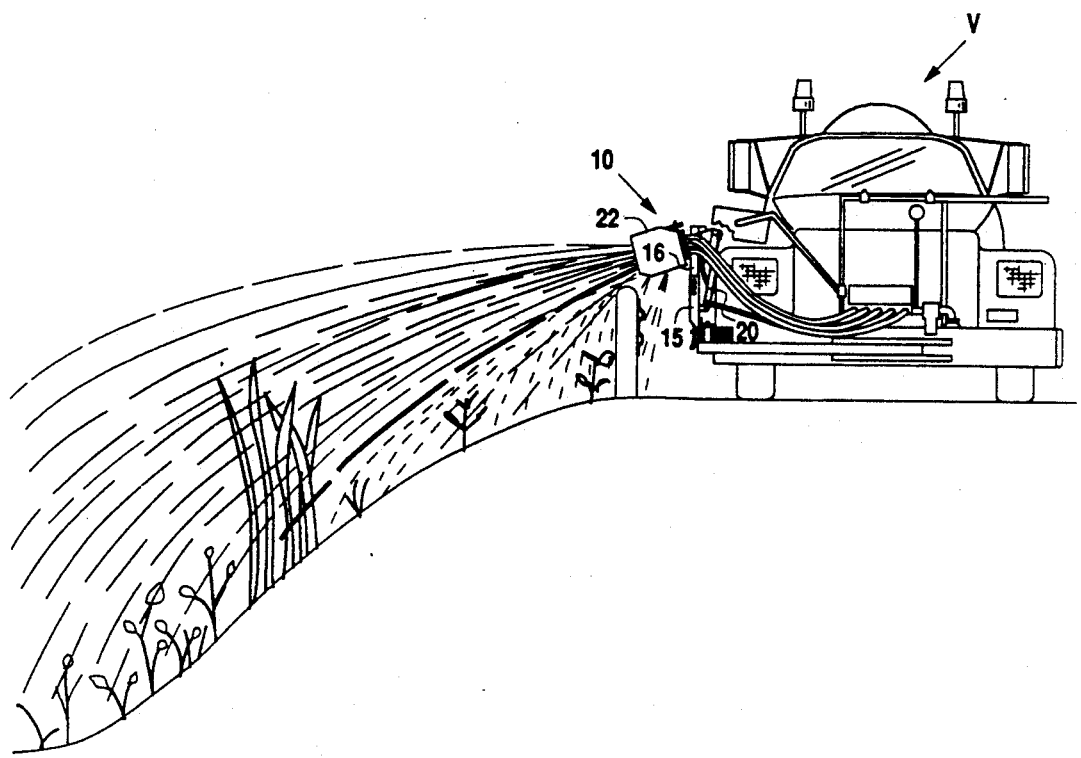
FIG. 3 shows the spraying apparatus of the invention mounted on a motor vehicle and the spray pattern of the device.
Figure 6:
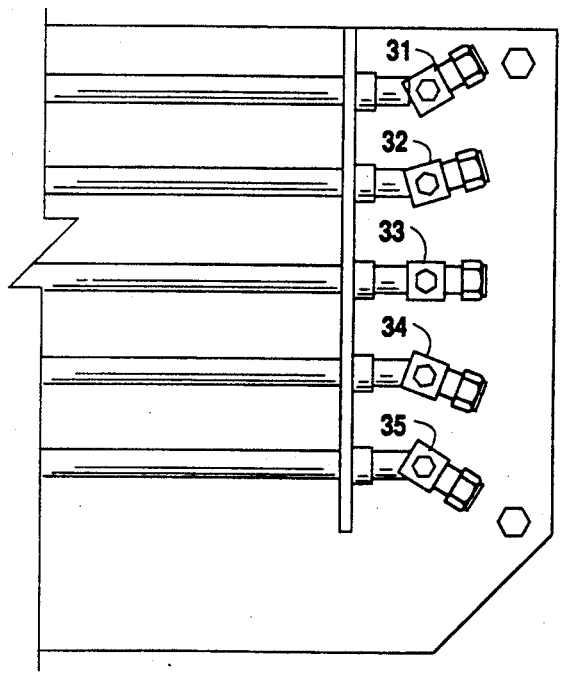
FIG. 6 is taken along 6—6 in FIG. 5.

The spraying apparatus includes a first nozzle means 30, as best shown in FIG. 2, for spraying an area adjacent or directly below the spraying means 22. The spraying means further includes a plurality of nozzle means 31, 32, 33, 34 and 35 as best shown in FIG. 6. These nozzle means may provide a large droplet size in a straight stream flow for spraying areas such as undesirable brush or weeds and objects closely or remotely adjacent to vehicle V. As will be apparent, the nozzles 31 through 35 are oriented to spray a narrow straight stream swath or area at short or long distances from the vehicle. The nozzle means 31 through 35 are controlled by an operator. They may be either controlled to spray at the same time or to selectively spray.

Figure 7:
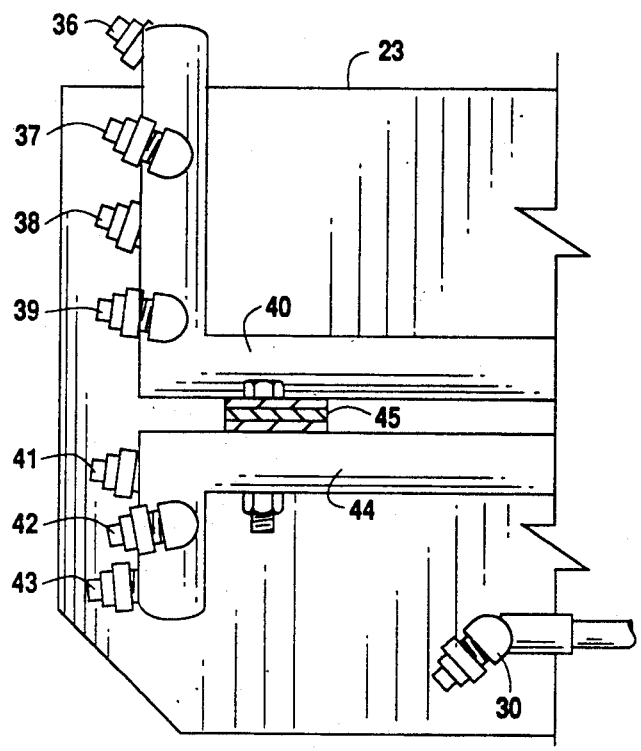
FIG. 7 is taken along line 7—7 in FIG. 5.

The spraying means 22 further includes nozzle means 36, 37, 38 and 39 as best shown in FIG. 7. The nozzle means 36 through 39 may be designed to spray relatively large droplets at a relatively large distance. The nozzles 36 through 39 are connected to a single supply pipe 40 which may be controlled by the operator to supply spray to the nozzles 36 through 39.

The spraying means 22 further includes nozzle means 41, 42 and 43 as also shown in FIG. 7. The nozzle means 41 through 43 are connected to supply pipe 44 which is selectively supplied with spray by an operator. The supply pipes 40 and 44 are connected by a bracket means 45 to the U-shaped shield 23. The nozzle means 41 through 43 may be oriented to spray a swath at a closer distance than are the nozzle means 36 through 39.

Figure 8:
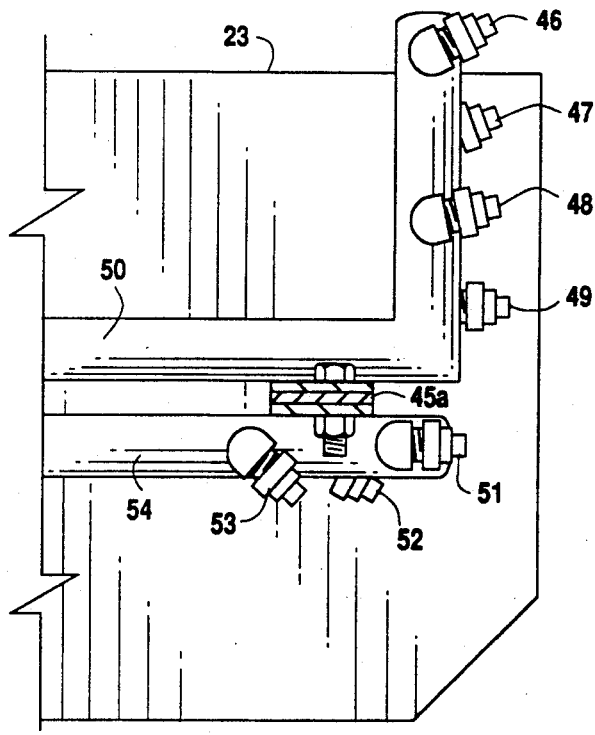
FIG. 8 is taken along line 8—8 in FIG. 5.

Referring to FIG. 8 of the drawing, there is shown nozzle means 46, 47, 48 and 49. The nozzle means 46 through 49 are connected to supply pipe 50. The supply pipe 50 is supplied with spray from the pumping unit (not shown) which is controlled by suitable valve means by the operator. The nozzle means 46 through 49 may be oriented to spray at a distance slightly less than the nozzle means 36, 37, 38 and 39.

Again referring to FIG. 8 there is shown nozzle means 51, 52 and 53. The nozzle means 51, 52 and 53 are connected to supply pipe 54 which is supplied with spray by the operator. The nozzle means 51, 52 and 53 may be oriented to spray at a relatively close distance. The supply pipes 50 and 54 are connected by bracket means 45a to the U-shaped shield 23.

These nozzles spray smaller droplets because they are located next to the truck. The particles must be smaller nearer the truck because the spray is moving at a line of travel parallel to the upright growing undesirable weeds and results in better herbicide coverage. As the weeds become a farther distance away from the vehicle, the spray, such as that delivered from nozzles 36 through 49, in FIG. 5, penetrate through the vegetation at a direction perpendicular to the upright plant.

The nozzle means 36, 37, 38 and 39 may be oriented to spray a swath at the farthest distance. It is preferably to use larger spray droplets to minimize draft at larger distances. The nozzle means 46, 47, 48 and 49 may be oriented to spray a swath adjacent the swath sprayed by the nozzles 36 through 39 but closer to the vehicle. The nozzle means 41, 42 and 43 may be oriented to spray a swath closer the vehicle but adjacent the swath sprayed by the nozzles 46, 47, 48 and 49. The nozzle means 51, 52 and 53 may be oriented to spray a swath closer to the vehicle than the nozzle means 41, 42 and 43 and adjacent to the swath sprayed by the nozzle means 41, 42 and 43.

The nozzles are mounted in a manner well known in the art.

In operation, an operator, through electrically operated solenoid switches controls the operation of the nozzle means to provide the desired spray. When it is desired to spray down hillsides, such as shown in FIG. 3, the spraying means 22 can be tilted downwardly by the hydraulic cylinder means 20. When it is desired to spray large objects such as trees, the spraying means 22 may be tilted upwardly as shown in FIG. 4 by the hydraulic cylinder means 20. By selectively controlling the solenoid operated switch means, which controls the various nozzle means, an operator can predetermine where the spray will be directed.

Although the invention has been described in conjunction with the foregoing specific embodiment, many alternatives, variations and modifications are intended to fall within the spirit and scope of the appended claims.

I claim:

1. Spraying apparatus for spraying chemical sprays from a moving vehicle in a plurality of laterally spaced swaths comprising:

a spray head;

said spray head including a plurality of spray nozzles;

each of said nozzles is oriented to cover respective adjacent swaths at a pre-selected distance from said spray head;

said nozzles are mounted on said spray head in selective groups to form a plurality of sets of nozzles;

means for selectively simultaneously activating all of said nozzles within a preselected set to provide the desired spray pattern and width of coverage; and said nozzles being mounted on said spray head on a predetermined fixed orientation with the nozzles in the set covering the swath zones furtherest from said spray head delivering larger droplet sizes and said nozzles in the set covering swath zones adjacent to said spray head delivering smaller droplet sizes and further wherein each of said nozzles in a given set is oriented so that said given set distributes chemical spray at a relatively constant and uniform distribution rate throughout the swath zone.

2. The apparatus of claim 1 including a support means for mounting said spraying apparatus to said vehicle and to adjust the angle of inclination of the spray head.

3. The apparatus of claim 2 wherein said spray head includes shield means for protection of said nozzles from the impact of obstructions which may be encountered by said spray head.

4. The apparatus of claim 2 wherein said means for adjusting the angle of inclination of said spray head includes remotely controlled power means.

* * * * *

(12) REEXAMINATION CERTIFICATE (4531st)
United States Patent
Kubacak et al.

(10) Number: US 5,215,255 C1
(45) Certificate Issued: Feb. 19, 2002

(54) ROADSIDE SPRAY APPARATUS

(75) Inventors: Johnny L. Kubacak, Jourdanton; Gary D. Byrd, Bulverde, both of TX (US)

(73) Assignee: Cibolo Manufacturing, Inc.

Reexamination Request:
No. 90/005,487, Sep. 8, 1999

Reexamination Certificate for:
Patent No.: 5,215,255
Issued: Jun. 1, 1993
Appl. No.: 07/685,518
Filed: Apr. 15, 1991

( * ) Notice: This patent is subject to a terminal disclaimer.

Related U.S. Application Data

(63) Continuation of application No. 06/722,411, filed on Apr. 10, 1985, now Pat. No. 5,007,585, which is a continuation of application No. 06/636,066, filed on Jul. 30, 1984, now abandoned, which is a continuation of application No. 06/348,509, filed on Feb. 12, 1982, now abandoned, which is a continuation-in-part of application No. 06/067,552, filed on Aug. 17, 1979, now Pat. No. 4,315,602.

(51) Int. Cl.[7] ............................. B05B 1/20; B05B 15/08
(52) U.S. Cl. ..................... 239/164; 239/172; 239/176; 239/288; 239/562
(58) Field of Search .................. 239/162, 164, 239/169, 170, 172, 288, 288.3, 562, 587.1, 587.3, 587.5, 288.5

(56) References Cited

U.S. PATENT DOCUMENTS

| 2,590,400 A | 3/1952 | Gollnick | 239/166 |
| 3,726,481 A | 4/1973 | Foster et al. | 239/754 |
| 3,871,130 A | * 3/1975 | Lavo et al. | 239/9 X |
| 3,994,438 A | 11/1976 | Farmery | 239/7 |
| 4,083,494 A | 4/1978 | Ballu | 239/156 |
| 4,172,557 A | 10/1979 | Davis | 239/77 |
| 4,197,995 A | 4/1980 | Cambell et al. | 239/74 |
| 4,269,356 A | 5/1981 | Rose | 239/167 |
| 4,353,505 A | 10/1982 | Kinder | 239/167 |

FOREIGN PATENT DOCUMENTS

| DE | 535493 | 7/1930 | |
| GB | 895023 | 4/1962 | 69/3 |

OTHER PUBLICATIONS

Cibolo Mfg Co., Inc. "Types of Herbicide Applications Made by "Swinglok" ©Sprayers," Cibolo Manufacturing, Inc., Nov. 15, 1980.

* cited by examiner

*Primary Examiner*—David A. Scherbel

(57) ABSTRACT

A roadside spray apparatus having a spraying head with a plurality of nozzles mounted on the spraying head. The inclination of the spraying head is selectively adjustable to direct spray to a desired location. The spray head includes a plurality of independently operated nozzles oriented to spray side-by-side swaths at the side of a vehicle.

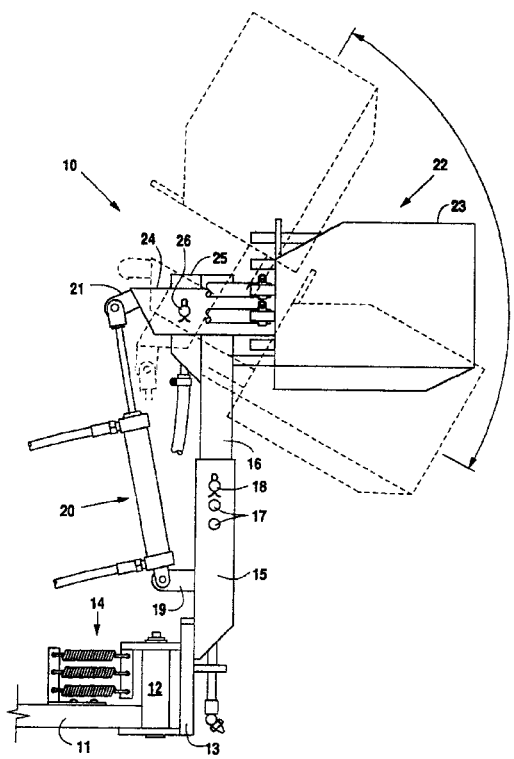

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claims 2 and 4 dependent on an amended claim, are determined to be patentable.

1. Spraying apparatus for spraying chemical sprays from a moving vehicle in a plurality of laterally [spaced] *adjacent* swaths, comprising:

a spray head;

said spray head including a plurality of [spray nozzles] *selective nozzle means*;

each of said *plurality of* nozzle[s] *means* is oriented to cover *a* respective adjacent swath[s] at a pre-selected distance from said spray head;

*each of* said *plurality of nozzle means comprising* nozzles [are] mounted on said spray head [in selective groups] to form [a] *one of said* plurality of [sets of] nozzle[s] *means*;

means for selectively simultaneously activating all of said nozzles within a [preselected set] *pre-selected nozzles means* to provide the desired spray pattern and width of coverage; and

*each of* said nozzle[s] *means* being mounted on said spray head on a predetermined fixed orientation with the nozzles [in the set] *in the nozzle means* covering the swath*s* [zones furtherest] *furthest* from said spray head delivering *a* larger *predetermined* droplet size[s] and said nozzles [in the set] *in the nozzle means* covering *the* swarh*s* [zones] adjacent to said spray head delivering *a* smaller *predetermined* droplet size[s] and further wherein each of said nozzles in a given [set] *nozzle means* is oriented so that said given [set] *nozzle means* distributes chemical spray [at] *in one of said larger or smaller predetermined droplet sizes to produce* a relatively constant and uniform distribution rate throughout the swath [zone].

3. The apparatus of claim 2 wherein said spray head includes shield means for protection of said *plurality of* nozzle[s] *means* from the impact of obstructions which may be encountered by said spray head.

* * * * *